Patented June 26, 1945

2,379,375

UNITED STATES PATENT OFFICE 2,379,375

RESINOUS CONDENSATION PRODUCTS AND THE LIKE

Frederick James William Popham, New Barnet, England, assignor to The British Rubber Producers' Research Association, London, England No Drawing. Application November 23, 1942, Serial No. 466,673. In Great Britain March 29, 1940

3 Claims. (Cl. 260—768)

This invention relates to synthetic resins, adhesive compositions, moulding powders and the like, including rubber or derivatives of rubber.

In United States specifications Nos. 2,227,797 and 2,273,393 there are described processes for the preparation of synthetic resinous products suitable for use in moulding compositions, which consist in simultaneously treating crepe rubber, smoked sheet, softened rubber or nitrite crumb with maleic anhydride and a phenol at elevated temperature, and subsequently condensing the rubber maleic anhydride-phenolic product with an aldehyde.

It has now been found as disclosed in United States application Serial No. 353,778 of which the present application is a continuation-in-part, that the process of manufacture is simplified and accelerated and may be more readily regulated with consequential improvement in the uniformity of the resinous products obtained by using oxidised rubber prepared, for instance, by previously oxidising the rubber in solution with air or oxygen in the presence of a metallic oxidising catalyst, such as cobalt linoleate and evaporating the solvent. The oxidation may be effected at elevated temperature and under pressure or instead of being carried out in solution, it may be achieved by dispersing the rubber over a large surface exposed to oxygen or air by means of a powdered, granular or porous vehicle as described in United States Patent specification No. 2,132,809.

According to the present invention synthetic resins are prepared by a process consisting in intimately mixing oxidised rubber prepared by the foregoing methods and containing 11–12% of oxygen with maleic anhydride and a phenol, heating the mixture in the presence of air or oxygen, and then reacting the mixture with formaldehyde while preventing undue rise in temperature.

Conveniently, the oxidised rubber previously prepared according to any of the methods described and in the form of a gum soluble in acetone but insoluble in methylated spirits (see Transactions of the Institution of the India Rubber Industry, vol. XVII, page 320), is in molecular proportion to the maleic anhydride, the ratio being three isoprene units of oxidised rubber to one of maleic anhydride, although satisfactory results are more cheaply obtained with as little as one fifth of this amount of maleic anhydride particularly if a suitable catalyst such as oxalic acid is present.

Conveniently also, the nature of the product can be varied by regulating the proportions of oxidised rubber to phenol in the mixture, the useful ratio being from 5 to 10 parts by weight of phenol to 3 parts by weight of oxidised rubber according to the degree of flexibility required, it being understood that higher relative proportions of oxidised rubber result in increased flexibility.

The resins obtained are soluble in ketones, alcohols and esters, but are insoluble in aromatic hydrocarbons and petroleum products. They possess thermo-setting and thermo-plastic properties and may be used directly as bonding agents for impregnating paper and fabric for the manufacture of laminated board possessing residual thermo-plasticity, or with fillers in the manufacture of sheet materials such as fibre board where this flexibility is desirable.

For the preparation of thermo-setting moulding compositions there is incorporated with the resin by hot rolling or in any appropriate manner, fillers such as wood flour, and a hardening agent such as hexa-methylene tetramine sufficient to bring the phenol:formaldehyde ratio to 1:1.15, the accepted moulding practice being followed, resulting in a product having good electrical properties.

In the practice of the invention according to a preferred embodiment of the process for the production of the resin, 224 grams of oxidised rubber prepared according to my aforementioned specification No. 2,132,809 and having an oxygen content of 11–12%, 20 grams of maleic anhydride with 4 grams of oxalic acid as catalyst and 470 grams of phenol are mixed by stirring in a vessel heated to about 60° C. in a current of oxygen or air, and when the mixture is homogeneous 150 grams of paraform are added and the temperature raised to 95°. The reaction is exothermic and it is desirable to cool the vessel so as to prevent the temperature rising above 110° so as to avoid loss of formaldehyde, the reaction continuing for about one hour and the temperature being maintained for another hour after the reaction has subsided, when the product is dehydrated under vacuum and a flexible resin is obtained which is soluble in ketones, alcohols and esters, but insoluble in aromatic hydrocarbons.

Where a less flexible resin is required, the same quantities of oxidised rubber and maleic anhydride with catalyst may be reacted with double the relative quantities of phenol and formaldehyde, that is to say, with 940 grams of phenol and 300 grams of paraform.

A normal phenol formaldehyde resin when mixed with wood flour in the proportion of 1 of resin to 2 of wood flour and tested give the following results:

| | |
|---|---|
| Water absorption, percent | 0.3– 0.4 |
| Surface resistivity: | |
| 75% humidity, megohms × 10⁴ | 20 – 80 |
| Water immersed, megohms × 10⁴ | 5 – 35 |
| Volume resistivity: | |
| 75% humidity, megohms × 10⁴ | 20 –100 |
| Water immersed, megohms × 10⁴ | 100 –500 |
| Breakdown voltage: | |
| 75% humidity, volts/mil | 220 –300 |
| Water immersed, volts/mil | Depends on water content of powder. |

A resin made in accordance with the example, when mixed with the same wood flour in the same proportions gave the following results:

| | | |
|---|---|---|
| Water absorption, percent | 0.198– 0.222 | Average 0.212 |
| Surface resistivity: | | |
| 75% humidity, megohms × 10⁴ | >10⁵ | |
| Water immersed, megohms × 10⁴ | 1.25 – 3.3 | Average 1.7 |
| Volume resistivity: | | |
| 75% humidity, megohms × 10⁴ | 230–340 | Average 300 |
| Water immersed, megohms × 10⁴ | 1400–2800 | Average 2300 |
| Breakdown voltage: | | |
| 75% humidity, volts/mil | | 370 |
| Water immersed, volts/mil | | 410 |

A less flexible resin made in accordance with the proportions given as an alternative in the example, when compounded and tested gave the following results:

| | | |
|---|---|---|
| Water absorption, percent | 0.183– 0.192 | Average 0.186 |
| Surface resistivity: | | |
| 75% humidity, megohms × 10⁴ | >10⁵ | |
| Water immersed, megohms × 10⁴ | 1.4 – 4.5 | Average 3.1 |
| Volume resistivity: | | |
| 75% humidity, megohms × 10⁴ | 600–1300 | Average 870 |
| Water immersed, megohms × 10⁴ | 3600–5800 | Average 5100 |
| Breakdown voltage: | | |
| 75% humidity, volts/mil | | 310 |
| Water immersed, volts/mil | | 480 |

Increasing proportions of maleic anhydride within the range stated may be used and with the same quantities and procedure as in the example above quoted the maleic anhydride may be increased to 98 grams when the reaction proceeds rapidly and satisfactorily. Cresol may be substituted for phenol if desired.

As previously indicated the resin may be used directly as a bonding agent or with the usual fillers, hardening agents and accelerators employed commercially in the preparation of moulded products from phenol formaldehyde.

The mixtures described give a freely flowing resin suitable for impregnation of fabrics, paper and the like. Resins in which only 70% of the rubber-maleic anhydride complex is employed do not impregnate quite so readily but the residual thermoplasticity and toughness is increased.

By the present invention an improved and simplified process for the preparation of resins is obtained which may be readily regulated to impart the desired characteristics to the product.

What I claim is:

1. A process for the preparation of synthetic resins consisting of intimately mixing a given quantity of oxidized rubber having an oxygen content of approximately 11% obtained by oxidizing rubber in solution with an oxidizing gas in the presence of a metallic catalyst such as cobalt linoleate with approximately 10% maleic anhydride, adding a less percentage of oxalic acid as a catalyst and a given quantity of a phenol substantially equal in weight to the total of the other ingredients, heating the mixture so formed to approximately 60° C. in the presence of oxidizing gas, and subsequently reacting the mixture with formaldehyde while preventing a rise in the reaction temperature of the mixture above 110° C.

2. A process for the preparation of synthetic resins according to claim 1 wherein the nature of the resinous product is controlled by regulating the proportions of oxidised rubber and phenol within the range of 5 to 10 parts by weight of phenol to 3 parts by weight of oxidised rubber, the higher relative proportions of oxidised rubber imparting flexibility to the product.

3. A process according to claim 1 wherein for the preparation of thermo-setting moulding compositions there is incorporated with the resin fillers, wood flour and a hardening agent, the latter preferably being hexa-methylene tetramine sufficient to bring the phenol:formaldehyde ratio to 1:1.15.

FREDERICK JAMES WILLIAM POPHAM.